United States Patent
Söderkvist et al.

(10) Patent No.: US 7,902,972 B2
(45) Date of Patent: Mar. 8, 2011

(54) SUPERVISING ARRANGEMENT

(75) Inventors: Jan Söderkvist, Enebyberg (SE); Peter Wahlström, Bromma (SE); Per-Erik Sundvisson, Stockholm (SE); Tauno Ruuska, Sollentuna (SE); Anders Elgcrona, Täby (SE)

(73) Assignee: Andrew Corporation, Orland Park, IL (US)

( * ) Notice: Subject to any disclaimer, the term of this patent is extended or adjusted under 35 U.S.C. 154(b) by 503 days.

(21) Appl. No.: 11/571,618

(22) PCT Filed: Jun. 21, 2005

(86) PCT No.: PCT/SE2005/000963
§ 371 (c)(1),
(2), (4) Date: Aug. 21, 2008

(87) PCT Pub. No.: WO2006/006907
PCT Pub. Date: Jan. 19, 2006

(65) Prior Publication Data
US 2008/0316013 A1     Dec. 25, 2008

Related U.S. Application Data
(60) Provisional application No. 60/521,829, filed on Jul. 8, 2004.

(30) Foreign Application Priority Data
Jul. 8, 2004   (SE) ...................................... 0401799

(51) Int. Cl.
*G08B 29/00*     (2006.01)

(52) U.S. Cl. ......... 340/506; 340/511; 340/3.43; 340/522
(58) Field of Classification Search .................. 340/506
See application file for complete search history.

(56) References Cited

U.S. PATENT DOCUMENTS

| | | | |
|---|---|---|---|
| 5,461,628 A | 10/1995 | Nakamura | |
| 5,950,150 A * | 9/1999 | Lloyd et al. | 702/183 |
| 6,098,181 A | 8/2000 | Hamilton, II et al. | |
| 6,542,075 B2 * | 4/2003 | Barker et al. | 340/506 |
| 2002/0022894 A1 * | 2/2002 | Eryurek et al. | 700/80 |
| 2002/0050926 A1 * | 5/2002 | Lewis et al. | 340/506 |

FOREIGN PATENT DOCUMENTS

| | | |
|---|---|---|
| EP | 1022631 | 7/2000 |
| JP | H06-103122 | 4/1994 |
| JP | H07-064793 | 3/1995 |
| JP | H09-081233 | 3/1997 |

(Continued)

OTHER PUBLICATIONS

Japanese Office Action issued on Jun. 14, 2010 in corresponding Japanese Patent Application No. 2007-520257.

(Continued)

*Primary Examiner* — Donnie L Crosland
(74) *Attorney, Agent, or Firm* — Albihns.Zacco AB

(57) ABSTRACT

A hierarchical fault handling system and method based on filtering data regarding entities in the system and coordinating said filtered data in order to determined if an entity is considered faulty or not. The result for all entities is coordinated in a system fault coordinating means (17) which makes the overall decision if the system considered to be faulty or not.

30 Claims, 4 Drawing Sheets

FOREIGN PATENT DOCUMENTS

| | | |
|---|---|---|
| JP | H09-298543 | 11/1997 |
| JP | H11-122467 | 4/1999 |
| JP | 2000-225991 | 8/2000 |
| JP | 2003-069661 | 3/2003 |
| WO | 0047003 | 8/2000 |
| WO | 03096729 | 11/2003 |

OTHER PUBLICATIONS

Chinese Office Action (No. 1) issued on Nov. 7, 2008 in corresponding Chinese Patent Application No. 200580029523.8.

Chinese Office Action (No. 2) issued on Jun. 5, 2009 in corresponding Chinese Patent Application No. 200580029523.8.

* cited by examiner

SUPERVISING ARRANGEMENT

TECHNICAL FIELD

The present invention relates to an arrangement for supervising the function of an assembly comprising a number of interworking parts as defined in the preamble of claim 1. The invention also relates to a method for supervising the function of an assembly as defined in the preamble of claim 23.

BACKGROUND AND RELATED ART

Generally, in large systems, such as production lines or computer systems, a supervising system is provided for identifying faults in the system. A number of detectors are used, each detector providing data to a supervising unit. If data from one detector indicates a faulty unit, an alarm is issued.

Thus, alarms may be issued for minor faults as well as major faults, which means that the operator has to deal with a number of alarms, often even in situations when the system is functioning. Also, errors tend to propagate to the system, so that the same fault can give rise to a number of alarms, which can be very confusing. For example, a low supply voltage can result in bit errors on transmission links, problems in locking a phase-locked loop, distorted radio transmission, and other faults, all resulting from the same problem.

OBJECT OF THE INVENTION

It is an object of the present invention to provide efficient and secure fault management in a supervising system, which should have a high probability of discovering faults while minimizing the risk of false alarms.

SUMMARY OF THE INVENTION

This object is achieved according to the invention by a supervising system for supervising the function of an assembly comprising a number of interworking parts, said system comprising At least a first detector for detecting a physical property of an entity of the system and providing measurement data about the physical property;
At least a first determining means for determining the status of said entity; said supervising system being characterized in that it comprises filter means arranged to receive measurement data from the at least first detector, filter said measurement data and output a signal indicating if said entity is faulty in dependence of said filtered measurement data; and
in that the determining means is arranged to receive said output signal from at least a first and a second filter means, co-ordinate said output signals and, on the basis of said co-ordination, determine whether a fault report should be generated for the entity.

The object is also achieved by a method for supervising the function of an assembly comprising a number of interworking parts, comprising the following steps:
  defining at least one entity of the system that is to be supervised;
  detecting at least one physical property of the entity as at least one measured value
  filtering the at least one measured value
  determining whether or not the entity is faulty on the basis of the filtered value
Thus, according to the invention, it can be determined in a reliable way whether or not an entity is considered to be faulty based on the processing of data from one or more detectors.

The filter means are preferably arranged to filter the measurement data on the basis of comparison with at least one threshold.

The supervising system may comprise at least a first action means for taking action to correct the fault in dependence of the status of said entity.

The supervising system preferably comprises a system fault determining means arranged to receive from at least two entity fault determining means reports regarding the status of at least two entities supervised by the at least two entity fault determining means and determine, on the basis of said reports a fault status for the system. In this way, a hierarchical system for fault handling is achieved, including filtering observations from different detectors, using observations from multiple detectors for determining whether or not a supervised entity is defective and finally coordinating alarms within the system to make the complete system take proper action in each situation and generate correct alarms to external systems and/or the operator.

In this way, fault reports from different parts of the system are coordinated so that the number of fault reports, or alarms, in the system is reduced. In particular, the number of fault reports, or alarms, resulting from the same fault is reduced. A single fault will not cause an avalanche of alarms even though it may affect the performance of several parts of the system. In the prior art, a fault will propagate in the system and a hardware fault can result in fault detections in other hardware, and/or in software, and vice versa.

To determine the overall status of the system, the system fault determining means may be arranged to check periodically all overall entity states X and determine the fault status of the system on the basis of these checks, where X indicates whether the entity is faulty or not and the absolute value of X indicates the reliability of the state. Alternatively, the system fault determining means may be arranged to request from each fault co-ordination means a report on the status of the entity or entities supervised by it, for example, when a fault has been raised or ceased for at least one entity.

The filter means may comprise filters arranged to receive and filter both analogue and digital measurement data.

In a preferred embodiment the supervising system is arranged to supervise a telecommunications system.

Parameters controlling the function of said filter means are stored in the system during manufacturing, delivered as part of a software application package and/or comprised in configuration data created for a particular site.

The system fault co-ordinator may be arranged to order a dump of some or all fault filters in the system to be stored in persistent memory, said dump containing state variables for fault filters. The dump can also comprise a traceback buffer containing the last minutes of detector data input to each fault filter. This dump can be used by repair personnel to determine what is wrong.

BRIEF DESCRIPTION OF THE DRAWINGS

In the following, embodiments of the invention will be described in more detail, with reference to the appended drawings, in which.

DETAILED DESCRIPTION OF EMBODIMENTS

Figure 1:
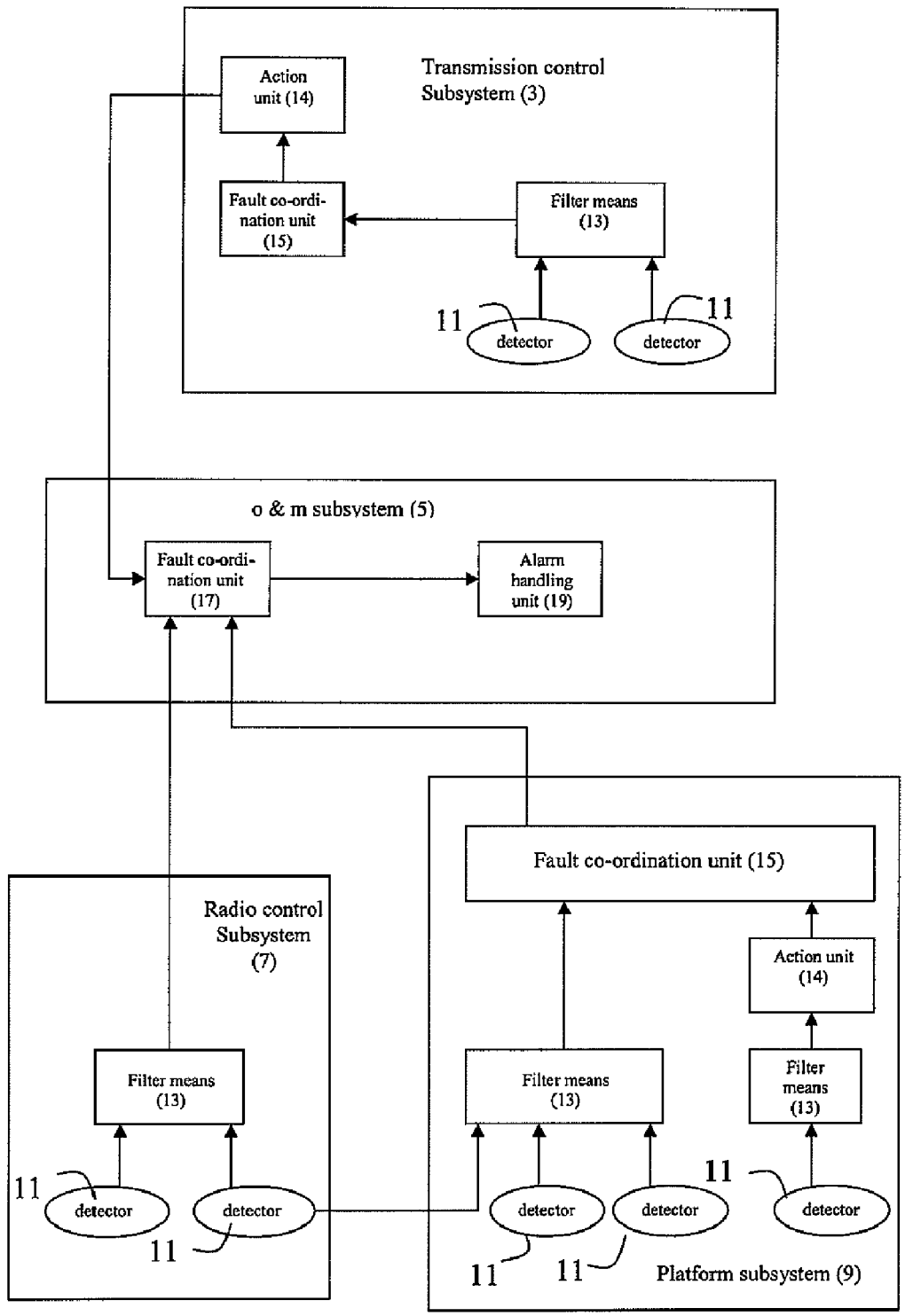
FIG. 1 is an overview of a telecommunications system in which the fault management method of the invention is implemented.

FIG. 1 is a logical overview of a telecommunications system in which the fault management method of the invention is implemented. The example system shown in FIG. 1 is a radio base station, which is divided into a number of subsystems, including a transmission control subsystem 3, for handling terrestrial transmission links, an Operation and Maintenance (O&M) subsystem 5, a third subsystem 7 and a fourth subsystem 9. In this example, the third subsystem is a radio control subsystem for controlling radio transmitters and receivers and the fourth subsystem is the platform subsystem for handling the processing platform, for example, processor intercommunication. The skilled person will realize that the system can comprise other subsystems in addition to, or instead of the ones shown here. Each subsystem comprises a number of blocks, each communicating with other blocks in the same sub-system and/or with blocks in other subsystems.

Each subsystem comprises a number of hardware and/or software units.

According to the invention, a number of entities to be monitored are defined. Each entity is supervised by a particular subsystem. A subsystem can be responsible for one or more entities. The division of a subsystem into entities may be made as found appropriate. Examples of entities are a physical transmission link, the radio transmitters and receivers and the processing system. For a radio transmitter entity, for example, the following factors (and others) will have to be supervised: frequency synthesizer, supply voltages for the different parts of the radio, current consumption, temperature, distortion, gain loop. Other entities may be external factors that affect the system, for example, the surrounding temperature, the quality of the incoming power supply or the quality of transmission links. If such an external entity is defective the surroundings could influence negatively the operation of the system.

Physical properties of the entities are monitored by detectors 11. Measurements from each detector are fed as raw data to a filter means 13 in the relevant subsystem. The filter means 13 filters the data, as will be described in more detail in the following. If a filter means 13 finds that the data received from the detector indicates that the entity is defect or has problems, it reports this to a fault coordination unit. If there is more than one detector/fault filter used for a particular entity, the subsystem preferably comprises an entity fault coordination unit 15 for co-ordinating fault reports from all the fault filters for this entity to determine if the entity should be considered faulty. In this case, the entity fault coordination unit 15 reports faults in the entity co-ordinated by it, to a system fault coordination unit 17 located in the O&M subsystem 5. Alternatively, co-ordination of all fault filters in one subsystem may be performed by a subsystem fault co-ordination unit on subsystem level (not shown).

In a preferred embodiment, one filter means only receives input data from one detector, whereas data from the same detector can be used as input data to several filters. It is possible, however, to use multidimensional filter means that would be able to process data from more than one detector. Such multidimensional filter means are known in the art The system fault co-ordination unit 17 determines, on the basis of data received from all subsystems 3, 5, 7, 9 in the system, whether or not the system should be considered faulty. If more than one entity is reported as faulty it also determines which fault is the primary fault and which faults are secondary, or concomitant, faults. The system fault co-ordination unit 17 also determines in what respect the system is faulty, for example hardware fault, software fault or environmental fault. In the case of a hardware fault, a hardware unit is probably defect and needs to be replaced. In the case of a software fault the system should be restarted and/or the current software version should be considered defective. If the software version is considered defective, use of a different software version should be tried. Possible environmental faults include poor power supply, excessive heat, and bad incoming transmission links.

The system fault co-ordination unit 17 also determines the proper action to take, for example, to switch off traffic and/or issue an alarm. If the system should be considered faulty, the system fault co-ordination unit 17 may initiate an alarm to be issued by an alarm handling unit 19. The system fault coordinator may select to suppress fault reports (that is, not issue an alarm) for one or more entities, depending on the status of other entities.

Action may be taken on subsystem level by an action means 14 which may be arranged between the filter means 13 and the subsystem fault co-ordination unit 15, or between the filter means 13 and the system fault co-ordination unit 15 if there is no subsystem fault co-ordination unit. In this case, preferably, the action means 14 instead of the filter means reports the fault to the subsystem fault co-ordination unit 15. Alternatively, the filter means 13 may be connected directly to the subsystem fault co-ordination unit 15. The action means 14 may be used, for example, to switch of a radio transmitter immediately to prevent damage and/or violation of regulations.

A third configuration is the one shown, in this example, in the transmission control subsystem 3. Here, a filter unit 13 receives measurement data from two detectors 11. The filter unit 13 reports the filtered measurement data to a subsystem fault co-ordination unit 15, which in turn forwards the result of the co-ordination to an action unit 14. The action unit also forwards the result to the system fault co-ordination unit 17.

The decision whether or not to consider a particular entity to be faulty is made by the subsystem on the basis of raw data from one or more detectors, as will be described in connection with FIG. 4. The decision is to be made in such a way as to minimize the risk of false alarm. Basing a decision on data from more than one detector increases the probability for detection while reducing the risk of false alarm.

On an abstract level, for each monitored entity a "fault managed object" FMO is defined, to supervise the monitored entity.

The output from a detector could be based on periodic measurements of an analogue property such as temperature, connected to an A/D converter, or period checking ("poll") of individual status bits from digital hardware, for example a "lock detector" for a phase-locked loop. Also, the output from a detector could be based on logging of detected mishaps, such as bit errors, or received data blocks with incorrect checksums.

A fault co-ordinator for one entity typically uses fault reports from more than one filter.

Figure 2:
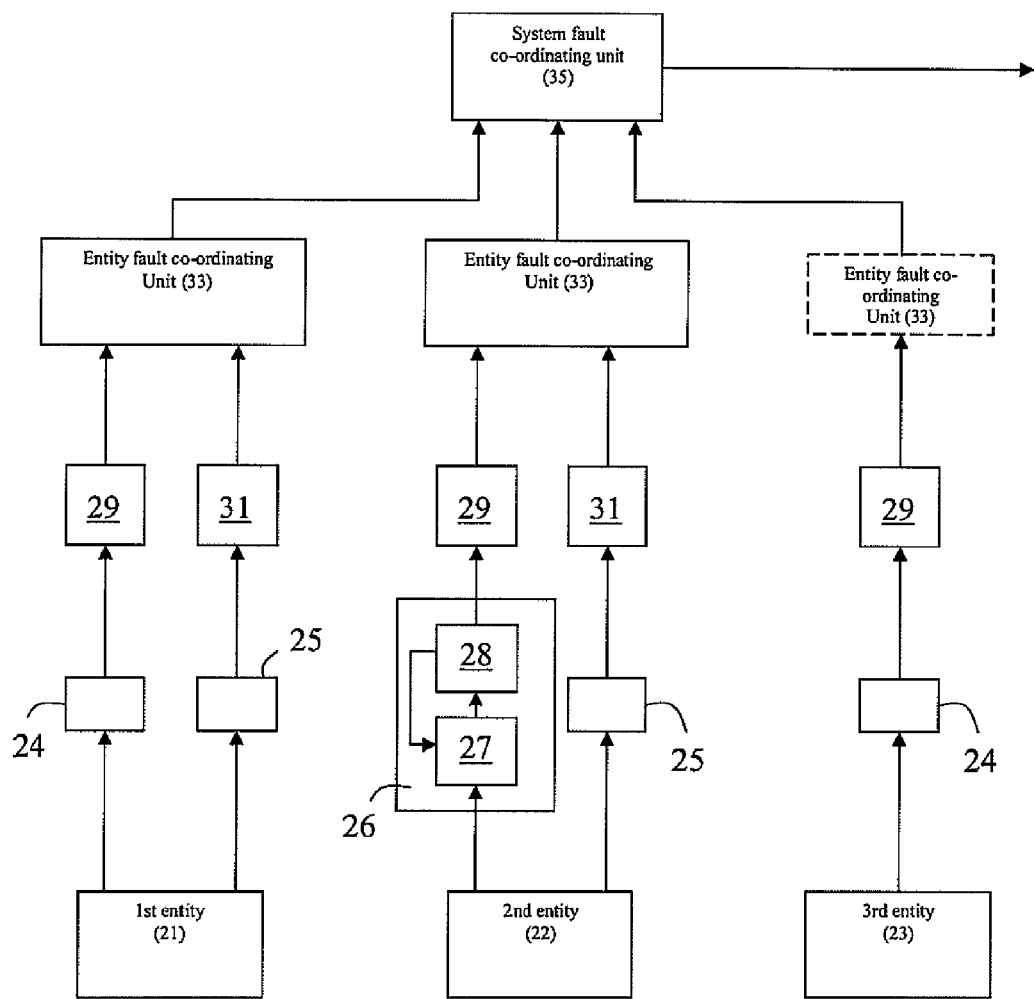
FIG. 2 is a logical representation of a fault handling hierarchy according to the invention.

FIG. 2 is a logical representation of an inventive fault handling hierarchy. A first, a second and a third entity 21, 22, 23 are shown, each of which is monitored by means of one or more detectors. The first entity 21 is monitored by an analogue detector 24 arranged to detect an analogue value of the entity 21 and a digital detector 25 arranged to detect a digital value of the entity 21. The second entity 22 is monitored by a digital detector 25 and by a counting means 26. The counting means comprises a counter 27 and a read and reset unit 28. The counter counts the number of occurrences of a particular state, or activity. The read and reset unit 28 reads the counter value at regular intervals and resets the counter 27. The third entity 23 is monitored by an analogue detector 24. The output from each analogue detector 24, and from the read and reset unit 28 of the counting means 26, is input to an analogue fault filter 29. The output from each digital detector 25 is input to a digital fault filter 31. The structure and function of the analogue and digital fault filters will be described in more detail below.

In a radio base station, one such supervised entity may be a radio transmitter. To supervise such a radio transmitter both analogue and digital detectors may be used. An analogue detector may be used to measure the consumption of power amplifier bias current. A detector may also be used to measure peak clipping. In this case, every time the input signal to the D/A converter of the radio transmitter is clipped, an event is generated to a peak clip counter. This peak clip counter is read regularly (for example, once every 10 seconds) and the value is fed to an analogue fault filter. Each time a value has been read from the peak clip counter the counter is reset.

Each fault filter 29, 31 is arranged to process the data received from the respective detector 24, 25, 26 to produce an output signal indicating if the entity should be considered faulty or not. The output signals from all fault filters that receive data from the same entity are fed to an entity fault co-ordination unit 33. If there is only one detector for an entity, as is the case with the third entity 23, the entity fault co-ordination unit can be omitted. In FIG. 2, the third entity 23 is also shown to have an entity fault co-ordinating unit 33.

The output signals from all entity fault co-ordination units 33 are fed to a system fault coordinating unit 35, which is responsible for fault co-ordination on system level. If there is any entity for which there is no entity fault co-ordinating unit 33 the output from the filter or filters receiving data from this entity is fed directly to the system fault co-ordinating unit 35. The signals fed to the system fault co-ordinating unit 35 should indicate for each entity whether or not an alarm should be raised or ceased for this entity.

If the system fault co-ordinating unit 35 determines, on the basis of information received from all voting unit and/or fault filters, that the system should be considered to be faulty, it will raise an external alarm. The system fault co-ordinator can also cease an alarm that has been raised, based on the information received from all voting unit and/or fault filters. The system fault co-ordinating unit 35 can receive such information from the voting units and/or fault filters automatically at regular intervals or when a fault is raised or ceased for an entity. Alternatively, the system fault co-ordinating unit can request such information from the voting units and/or fault filters when needed.

Figure 3:
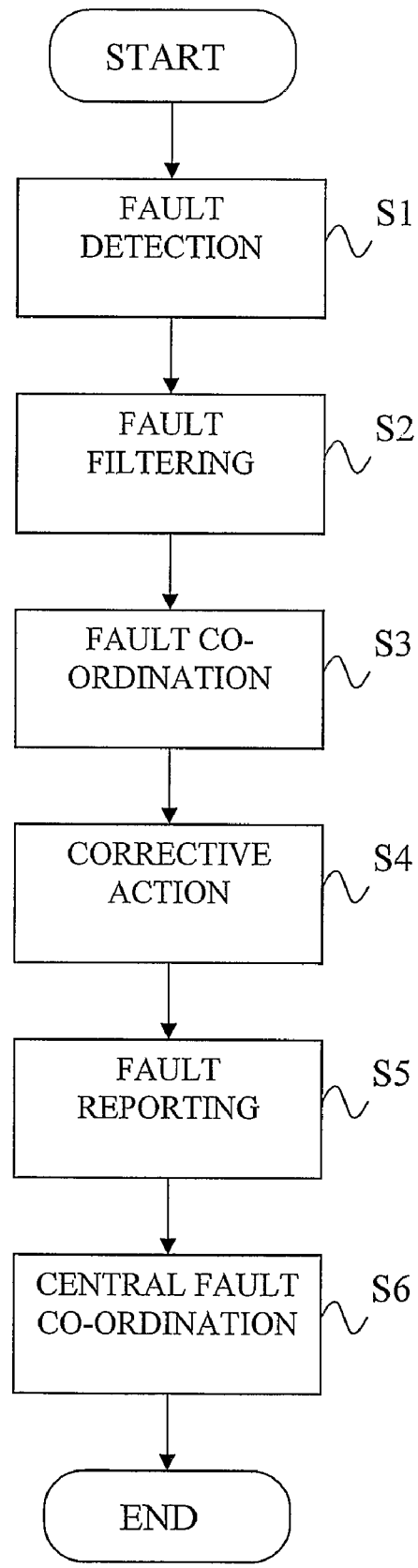
FIG. 3 is a flow chart of the main steps of the fault handling method according to the invention.

FIG. 3 illustrates the main steps of the inventive fault handling method. Each of the steps outlined here will be described in detail below. The first step S1 is collection of raw data, that is, physical parameters characterizing a particular monitored entity, for example, the voltage across a unit.

In step S2 the raw data collected in step S1 are filtered to produce a Boolean value indicating whether or not an alarm should be issued for a particular monitored entity. Data from one or more detectors may be considered together.

Step S3 is a fault co-ordination step performed internally within a fault managed object, or within a subsystem, to ensure that only one fault is reported if multiple faults having the same source are detected.

In step S4 possible corrective action to be taken because of the fault is determined in the coordinating subsystem. Examples of such corrective actions are stopping traffic through the system or issuing an alarm to the operator.

Step S5 is a in which the co-ordination block used in Step S3 reports to a coordinating subsystem if an entity should be considered to be faulty. In the system shown in FIG. 1 this is the O&M subsystem.

Step S6 deals with central fault co-ordination. The reported faults are handled at the central fault co-ordination unit and filtered for the alarm evaluator function.

The fault reports, or alarms, to the operator could be coordinated in several different ways. In a preferred embodiment an alarm will only indicate "software faulty" or "hardware faulty". To make the alarm more detailed, the subsystem, or block, comprising the faulty hardware or software could be indicated. Of course, it would also be possible to point out each faulty entity.

One or more crucial errors could be defined that are to be reported directly to the co-ordinating subsystem without filtering. Preferably, this is reserved for catastrophic errors such as a crash in the software system that makes continued operation impossible.

In a preferred embodiment, each fault filter receives parameter values as raw data from one detector as an input signal and filters it. It would be possible to let each fault filter receive values from more than one detector. The filter has a number of parameters controlling low-pass filtering, thresholds, hystereses etc. The output from the filter is a Boolean value indicating whether this particular detector indicates that an alarm should be raised or cleared for a monitored entity.

The same detector can be used as input to fault filters belonging to different monitored entities, for example, for temperature and power supply voltage. The same detector can also provide input to more than one fault filter for the same monitored entity, for example with different threshold levels or smoothing low-pass filters.

The fault filter co-ordination can be performed in a number of different ways:

The simplest form of co-ordination is to issue an alarm for a monitored entity if any one of the detectors for this entity indicates a fault. If none of the fault filters for an entity indicates a fault, an alarm that has been issued may be cleared.

Alternatively, a majority decision could be used. In this case, if a majority of the fault filters for a particular monitored entity indicate a fault then an alarm is issued for the monitored entity. If a majority for a monitored entity indicate that no fault is found the alarm can be cleared.

A third alternative for fault filter co-ordination would be to give each fault filter a weight depending on how important it is for a particular monitored entity. This fault coordination could be achieved, for example by subtracting, for each fault filter that indicates a fault, a value corresponding to its weight from a total value. For each fault filter indicating no fault a value corresponding to its weight is added to the total value. If the total value is negative an alarm should be issued, otherwise any alarm that has been issued may be cleared.

In a further development of this third alternative, each fault filter can be able to handle three or more different output values, for example, −1, 0 and +1, where −1 indicates a problem, 0 indicates an undetermined state and +1 indicates that everything is ok. In this case, two thresholds are needed. If the measured parameter is below the first threshold, everything is ok, and if it is above the second threshold there is a problem. If the measured parameter is between the thresholds the state is undetermined. The undetermined state can also be used if there is no observation during the measuring interval.

The use of more than two levels facilitates the fault co-ordination for an entity, in that everything adds up easily. Assuming that an entity is monitored by a number of detectors, that each detector is read periodically by at least one fault filter I=1 ... k, and that the observation passes through a fault filter that is read periodically and each fault filter is assigned a "weight" $k_i$, the overall entity state X for an entity at a given point in time will be $$X(t) = \frac{\sum_{\forall i} k_i \cdot y_i(t)}{\sum_{\forall i} k_i} \quad (1)$$

If X(t)<0, this indicates that the entity should be considered as faulty. If X(t)>0 this indicates that the entity is ok. If there are no observations available all y will be 0 and therefore X will be zero and the state will be undetermined. The absolute value of X indicates the reliability of the state.

Instead of summation another method could be used, for example "maximum absolute value", or finding the most probable state. One such method can be described by the following three steps:

1. determine $X_{min}(t) = \text{MIN}_{\forall i}(k_i \cdot y_i(t))$
2. determine $X_{max}(t) = \text{MAX}_{\forall i}(k_i \cdot y_i(t))$
3. If $X_{max}(t) > \text{ABS}(X_{min}(t))$ then $X(t) = X_{max}(t)$ else $X(t) = X_{min}(t)$ It should be noted that the same detector may provide input data to more than one filter.

Above, some examples of how to co-ordinate the results from different fault filters have been described. As will be appreciated by the skilled person, several other co-ordination methods are perceivable.

In a simple embodiment each subsystem only reports to the system fault co-ordination unit 17 whether or not each of its entities is considered to be ok or faulty, that is, if a fault has been raised for the entity or not. A report is sent each time the state of an entity is changed and the system fault coordinator has a list of the latest known states of all monitored entities. Alternatively, when a fault is raised or ceased for an entity, the subsystem responsible for this entity sends a signal to the system fault coordinator 17. When the system fault coordinator receives this signal, it requests information about the overall entity state X of all entities so that a total evaluation may be made.

Alternatively, the system fault coordinator 17 periodically checks all overall entity states X so that a total evaluation may be made.

The total evaluation may be made according to several different alternatives. For example, if one entity indicates a problem an external alarm is raised. The alarm type is indicated by a reference list of alarms for each entity. If more than one entity indicates a problem an alarm is generated in dependence of the entity having the most reliable fault indication. In the example above, this would mean having the highest negative value for X.

Fault filters may be arranged to handle observations that are either digital or analogue. Digital filters receive input signals from detectors where each observation is only 0 or 1, for example from checking a status bit. Analogue filters receive data that may be a floating point or an integer value, for example, the output from an A/D converter or a sum of error indications over a measurement period.

Finding optimal settings for each fault filter can be complicated. Often, incorrect settings result in either too insensitive systems, where faults are not detected, or false alarms. Preferably, parameters for each fault filters are stored in data files. It would be possible to include the filter parameters into the software application, but this would make it very difficult to change them. Instead, filter parameters are saved in data files, which can be easily modified.

Some of the fault filters are very hardware-dependent and are stored in the manufactured hardware units during production. Some of these hardware-dependent filters depend mainly on the version of hardware (that is, they are only changed when the design of the hardware is changed). Others must be adjusted for each individual unit during production (for example, threshold settings, which depend on radio components).

Some of the fault filters are more dependent on the software application or the environment, for example, the quality of the input transmission lines, and are therefore delivered as part of the software application. If necessary, a set of fault filter parameters delivered with the unit can be substituted with a new set of parameters delivered with the application. In this way, fault filters that do not work well enough can be adjusted. It would also be possible to give the end-user the possibility to adjust filter parameters individually for each installation. Thus, parameters can be stored either in the unit during production, in a data file that is part of the delivered software application or in a data file created by the end-user, for example, during the installation. A combination of the three is possible. If parameters for the same fault filter are available in more than one of these files a priority should be set between them. For example, the software application should first try to find filters in the installation configuration files. If not available there, then it should use files that are part of the application and if they cannot be found there either it should use data files stored in the unit (production data). Of course, a different priority order could be used, for example, production data could be used before software package data.

All reports of changed status of every monitored entity in the system are reported to a central unit, the fault co-ordinator. This fault co-ordinator is responsible for deciding on the appropriate action to be taken because of the received information (either to set an alarm or to cease an alarm).

If the fault co-ordinator discovers that the system is not working properly, or is defective, it orders a total dump of some or all fault filters in the system. The dump contains state variables for all fault filters; for example, filter states, data buffers for filters, filter outputs and decisions, and a traceback buffer containing the last minutes of detector data input to each fault filter. The dump is stored in persistent memory so that it will survive a power-off of the unit. The dump can be retrieved by the repair shop if the unit is sent to repair and used for troubleshooting and also to judge whether the reported problem has been caused by external factors, such as over temperature, low supply voltage etc.

Figure 4:
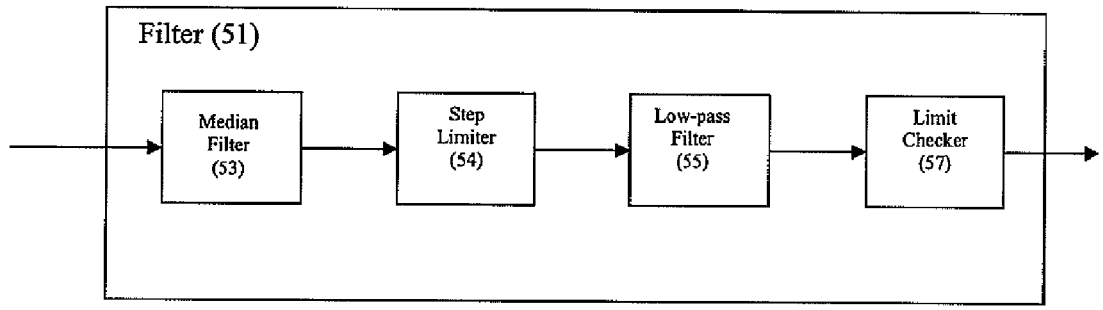
FIG. 4 shows a filter for processing analogue observations, that may be used with the invention.

In addition to the state variables, the dump can provide other types of information, such as (the example being adapted for a radio base station):
    how the equipment was used when the fault occurred, for example, idle, selftest-ordered test, traffic
    parameter settings for the equipment when the fault occurred, such as
        selected transmitter frequency
        selected receiver frequency
        selected output power for transmitter traffic scenario (if the fault occurred when the unit was used for traffic)
    configuration of parameters for the cell and for common traffic channels
        number of active "dedicated traffic channels (for single mobile terminals), including parameter settings An example of a filter 51 for processing analogue observations is shown in FIG. 4. This filter is arranged to process analogue observations and determine whether or not these observations indicate a fault problem. Such a filter will be referred to as an analogue fault filter in this document. Each time an analogue value is inserted in the filter the filter evaluates if a fault is to be raised or ceased. The analogue value from a detector is input to a median filter 53 which evaluates the median value of the last N samples and passes the median value to the next filter step. The number of samples to be held in the buffer associated with the median filter 53 can be set as a parameter. The last N samples are kept as internal data in the median filter.

The median value is passed on to a step limiter 54, which is preferably included, to avoid getting large steps into a low-pass filter 55 arranged to receive the output signal from the step limiter 54. The step limiter 54 compares each new input sample from the median filter 53 to the previous sample and if the difference is too large the step limiter reduces the new sample to keep the step within allowed limits. The step limiter has two parameters: the maximum raising step (that is, the maximum difference, or allowed increase for the new sample) and maximum decreasing step (that is the maximum allowed decrease for the new sample.

The low-pass filter 55 filters the value received from the step limiter 54. The low-pass filter can be any kind of standard low-pass filter, for example, a butterworth filter. The parameters for the low-pass filter can for a simple filter simply be the Q-factor. For more complex filters all filter order and coefficients can be adjusted. Internal data in the low-pass filter is the filtered value. The filtered median value is output to the limit checker 57. The limit checker checks the filtered value received from the low-pass filter against an upper and a lower threshold, where hysteresis can be obtained. The upper and lower thresholds are used to determine if a fault is to be raised, or ceased, respectively. A separate parameter may be used to invert the function, so that a fault is indicated if the value drops below the lower threshold. The output from the analogue filter is a Boolean value indicating if an alarm should be raised or ceased.

A simpler analogue filter would use only one threshold.

Figure 5A:
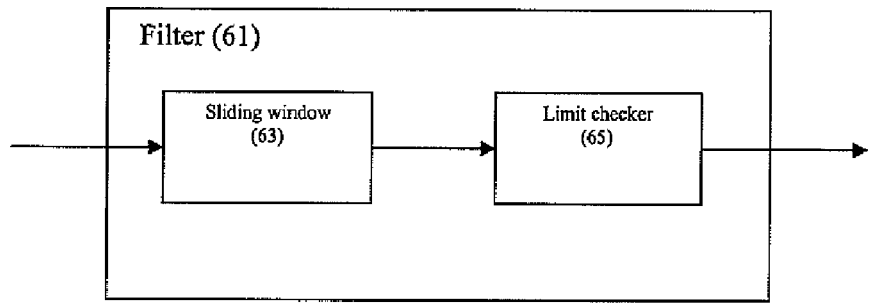
FIGS. 5A and 5B shows filters for processing Boolean observations, that may be used with the invention.

Another example filter 61 is shown in FIG. 5A. This filter is arranged to process digital observations and determine whether these observations indicate a fault or problem. In this document this will be referred to as a digital fault filter. A sliding window 63 stores the most recent samples of the binary value and determines for each sample whether or not it indicates a fault. A limit checker 65 connected to the sliding window 63 checks if the number of samples indicating a fault exceeds an upper threshold and also checks if the number of samples is below a lower threshold. If the number of samples indicating a fault exceeds the upper threshold an alarm the limit checker raises an alarm. If the number of samples indicating a fault is below the lower threshold an alarm can be ceased, if it has been raised. In this way, hysteresis can be obtained. The output from the filter is a Boolean value indicating if a fault should be raised or ceased, depending of the comparison of data to the thresholds.

Figure 5B:
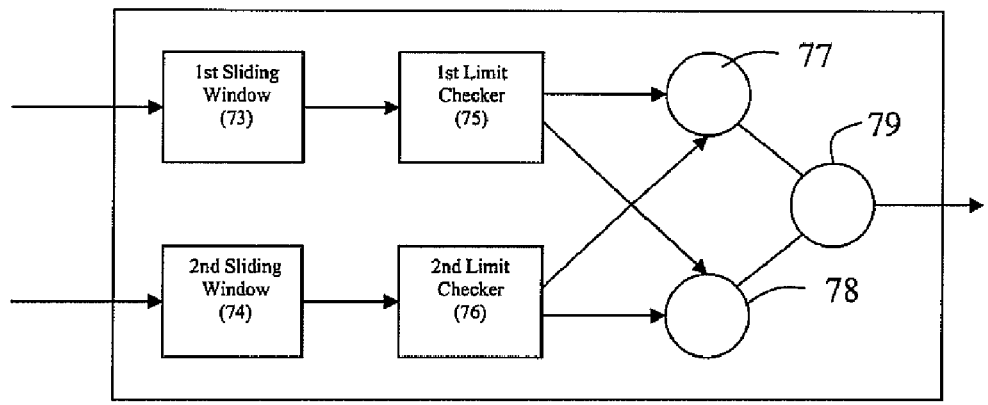

FIG. 5B shows a digital filter 71 using a first and a second sliding window 73, 74 and a first and a second limit checker 75, 76 receiving data from the first and the second sliding window, respectively.

By setting different sizes of the sliding windows 73, 74 for each filter, and different thresholds in the limit checkers 75, 76 two supervising functions can be combined so that a high fault frequency for a short period of time is reported while a lower fault frequency would only be reported if it lasted for a longer period of time. Both limit checkers are connected to a first and a second voting unit 77, 78. If one limit checker 75, 76 determines that its upper threshold is exceeded it sends a raise signal to the first voting unit 77. If one limit checker 75, 76 determines that its lower threshold is exceeded it sends a cease signal to the second voting unit 78. The first and second voting unit 77, 78 are connected to a third voting unit 79 that coordinates the output of from the first and second voting unit.

The first voting unit 77 is preferably arranged to indicate a fault if the content within any of the two sliding windows is above the threshold, that is, if one of the two limit checkers determines that its threshold is exceeded. Alternatively, the content of both sliding windows must be above the threshold. The second voting unit 78 may be arranged to output a cease fault indication if any one of the two sliding windows is below the threshold, or both sliding windows may have to be below the threshold. Preferably, the third voting unit 79 is arranged to raise a fault if the output of the first voting unit 77 indicates a fault, no matter what the output from the second voting unit 78 was. The output from the third voting unit 79 is a Boolean value indicating if a fault should be raised or not.

Analogue filters could also be combined in a similar way. Of course, more than two filters could be used together in a similar way.

The invention has been described above as applied in a telecommunications system comprising a number of sub-systems. It should be understood, however that the supervision of any system, such as a production line, could be arranged in the hierarchical way according to the invention.

The invention claimed is:

1. A supervising system for supervising the function of an assembly comprising a number of interworking parts, said system comprising
    At least a first detector for detecting a physical property of an entity of the system and providing measurement data about the physical property;
    At least a first determining means for determining the status of said entity;
    said supervising system comprising filter means arranged to receive measurement data from the at least first detector, filter said measurement data and output a signal indicating if said entity is faulty in dependence of said filtered measurement data; and
    in that the determining means is arranged to receive said output signal from a least a first and a second filter means, co-ordinate said output signals and, on the basis of said co-ordination, determine whether a fault report should be generated for the entity.

2. A supervising system according to claim 1, wherein the filter means are arranged to filter the measurement data on the basis of comparison with at least one threshold.

3. A supervising system according to claim 1, further comprising at least a first action means for taking action to correct the fault in dependence of the status of said entity.

4. A supervising system according to claim 1, comprising a system fault determining means arranged to receive from at least two entity fault determining means reports regarding the status of at least two entities supervised by the at least two entity fault determining means and determine, on the basis of said reports a fault status for the system.

5. A supervising system according to claim 4, wherein the system fault determining means is arranged to check periodically all overall entity states X and determine the fault status of the system on the basis of these checks, where X indicates whether the entity is faulty or not and the absolute value of X indicates the reliability of the state.

6. A supervising system according to claim 4, wherein the system fault determining means is arranged to request from each fault co-ordination means a report on the status of the entity or entities supervised by it.

7. A supervising system according to claim 6, wherein the system fault determining means is arranged to request said report when a fault has been raised or ceased for at least one entity.

8. A supervising system according to claim 1, wherein the filter means comprise at least one filter that is arranged to receive and filter analogue measurement data.

9. A supervising system according to claim 8, wherein the filter means comprises a median filter arranged to receive an analogue value from a detector, calculate the median value of a number of such analogue values and pass the median value to a low-pass filter arranged to filter the median value and output the filtered median value is output to the limit checker arranged to check the filtered value received from the low-pass filter against at least one threshold, to determine if a fault is to be raised, or ceased, respectively.

10. A supervising system according to claim 9, further comprising a step limiter arranged to receive the median value from the median filter, determine the difference between said median value and a previous median value and, if said difference is greater than a maximum raising step or a maximum decreasing step, adjust the median value to a value to keep the step within allowed limits.

11. A supervising system according to claim 9, wherein the low-pass filter is arranged to filter the median value.

12. A supervising system according to claim 9, wherein the limit checker is arranged to check the filtered value against an upper and a lower threshold so that hysteresis can be obtained.

13. A supervising system according to claim 1, wherein the filter means comprises at least one filter that is arranged to receive and filter digital measurement data.

14. A supervising system according to claim 13, wherein the filter means is arranged to filter data in the form of binary values, and comprises at least one buffer arranged to store the most recent samples of the binary value and determine, for each sample, whether or not it indicates a fault, and a limit checker connected to the buffer arranged to compare the number of samples indicating a fault to at least one threshold to determine if an alarm should be raised or ceased.

15. A supervising system according to claim 14, wherein the limit checker is arranged to compare the number of samples indicating a fault to an upper and a lower threshold to obtain hysteresis.

16. A supervising system according to claim 1, wherein the filter means comprises at least two buffers at least two limit checkers each connected to one of the buffers and voting means arranged to determine, on the basis of the output from all limit checkers if a fault should be raised or ceased.

17. A supervising system according to claim 1, wherein the filter means comprises means for filtering received measurement data on the basis of at least two different sets of filter constants, to produce at least two different logical values and means for determining a logical output signal from the filter means.

18. A supervising system according to claim 1, characterized in that it is arranged to supervise a telecommunications system.

19. A supervising system according to claim 1, wherein parameters controlling the function of said filter means are stored in the system during manufacturing.

20. A supervising system according to claim 1, wherein parameters controlling the function of said filter means are comprised in a software application package.

21. A supervising system according to claim 1, wherein parameters controlling the function of said filter means are comprised in configuration data created for a particular site.

22. A supervising system according to claim 1, wherein the system fault co-ordinator is arranged to order a dump of some or all fault filters in the system to be stored in persistent memory, said dump containing state variables for fault filters.

23. A supervising system according to claim 22, wherein the dump further comprises a traceback buffer containing the last minutes of detector data input to each fault filter.

24. A method for supervising the function of an assembly comprising a number of interworking parts, comprising the following steps:
    defining at least one entity of the system that is to be supervised;
    detecting at least one physical property of the entity as at least one measured value;
    filtering the at least one measured value;
    determining whether or not the entity is faulty on the basis of the filtered value.

25. A method according to claim 24, wherein the filter is arranged to output a logical indication of whether or not the measured value indicates that the entity is considered faulty.

26. A method according to claim 24 further comprising the step of determining whether or not the entity is faulty on the basis of several filtered values output from several filters as a result of the filtering of several measured values each corresponding to a physical property of the entity.

27. A method according to claim 26 wherein a decision on whether or not an entity is faulty is determined on the basis of a weighted sum of the output from several filters.

28. A method according to claim 24, wherein a fault status for the entire assembly is determined on the basis of decisions regarding several entities in the assembly.

29. A method according to claim 24, wherein the step of filtering the at least one measured value comprises filtering the value on the basis of at least two different sets of filter constants to produce at least two different logical values and means for determining a logical output signal from the filter means.

30. A method according to claim 23, further comprising the step of ordering a dump of some or all fault filters in the system to be stored in persistent memory, said dump containing state variables for fault filters.

* * * * *